United States Patent
Pawar et al.

(10) Patent No.: US 10,959,156 B2
(45) Date of Patent: Mar. 23, 2021

(54) SYSTEM AND METHOD FOR CATEGORIZING AND ROUTING NETWORK TRAFFIC ASSOCIATED WITH USER EQUIPMENT

(71) Applicant: RELIANCE JIO INFOCOMM LIMITED, Mumbai-Maharashtra (IN)

(72) Inventors: Anil Pawar, Mumbai-Maharashtra (IN); Rajat Bansal, Delhi (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 59 days.

(21) Appl. No.: 16/377,435

(22) Filed: Apr. 8, 2019

(65) Prior Publication Data

US 2019/0313318 A1 Oct. 10, 2019

(30) Foreign Application Priority Data

Apr. 10, 2018 (IN) .............................. 201821013713

(51) Int. Cl.
*H04W 4/24* (2018.01)
*H04W 40/24* (2009.01)
(Continued)

(52) U.S. Cl.
CPC ......... *H04W 40/246* (2013.01); *H04L 45/245* (2013.01); *H04L 45/74* (2013.01);
(Continued)

(58) Field of Classification Search
CPC ... H04L 12/14; H04L 12/1407; H04L 45/245; H04L 45/38; H04L 45/74; H04M 15/57;
(Continued)

(56) References Cited

U.S. PATENT DOCUMENTS 7,756,024 B1 * 7/2010 Croak .................. H04L 1/0022
370/230
8,214,889 B2 * 7/2012 Bahl ................... H04L 63/1416
726/11

(Continued)

*Primary Examiner* — Phuc H Tran
(74) *Attorney, Agent, or Firm* — Hunton Andrews Kurth LLP

(57) ABSTRACT

Embodiments of the present invention relate to a system [100] and method [300] for categorizing and routing network traffic associated with at least one user equipment [102]. More particularly, the embodiments may disclose a method for providing at least two wireless networks [1A/1B/2A/2B]; establishing a connection between the at least one user equipment [102] and one of the at least two wireless networks [1A/1B/2A/2B]; receiving the network traffic from the at least one user equipment [102] through one of the at least two wireless networks [1A/1B/2A/2B]; categorizing the network traffic received from the at least one user equipment [102] based on a unique service set identifier of one of the at least two wireless networks [1A/1B/2A/2B]; and routing the network traffic from the routing device [104] to a corresponding gateway [108] based on the categorization.

14 Claims, 7 Drawing Sheets

(51) Int. Cl.
  *H04W 76/11* (2018.01)
  *H04W 76/15* (2018.01)
  *H04L 12/741* (2013.01)
  *H04W 88/16* (2009.01)
  *H04L 12/709* (2013.01)
  *H04W 84/12* (2009.01)

(52) U.S. Cl.
  CPC .............. *H04W 4/24* (2013.01); *H04W 76/11* (2018.02); *H04W 76/15* (2018.02); *H04W 88/16* (2013.01); *H04W 84/12* (2013.01)

(58) Field of Classification Search
  CPC ...... H04M 15/61; H04M 15/62; H04M 15/64; H04M 15/66; H04M 15/8044; H04W 40/02; H04W 40/246; H04W 4/24; H04W 76/11; H04W 76/12; H04W 76/15; H04W 84/12; H04W 88/16
  See application file for complete search history.

(56) References Cited

U.S. PATENT DOCUMENTS

| | | | |
|---|---|---|---|
| 9,930,012 B1 * | 3/2018 | Clemons, Jr. | H04L 63/10 |
| 10,264,515 B2 * | 4/2019 | Horn | H04L 69/08 |
| 2013/0142050 A1 * | 6/2013 | Luna | H04L 67/32 |
| | | | 370/241 |
| 2017/0359449 A1 * | 12/2017 | Ahn | H04L 45/745 |

* cited by examiner

SYSTEM AND METHOD FOR CATEGORIZING AND ROUTING NETWORK TRAFFIC ASSOCIATED WITH USER EQUIPMENT

CROSS-REFERENCE TO RELATED APPLICATIONS

This application is the U.S. National Stage of and claims priority to Indian Patent Application No. 201821013713 filed Apr. 10, 2018, the contents of which are incorporated herein by reference in its entirety.

TECHNICAL FIELD

Embodiments of the present invention generally relate to wireless communication. In particular, embodiments of the present invention relate to a system and method for categorizing and routing network traffic associated with at least one user equipment.

BACKGROUND

This section is intended to provide information relating to general state of the art and thus any approach/functionality described herein below should not be assumed to be qualified as a prior art merely by its inclusion in this section.

In a traditional cellular deployment, suitable powered macro base stations are being deployed to cover sufficiently large areas to provide cellular network/coverage. However, with the deployment of macro base stations only, it generally suffers with quick capacity degradation with the increase in number of user equipment's operating in the coverage area of the macro base stations. Additionally, the macro base stations provide good coverage and strong signal strength in outdoor locations, but unable to provide the same kind of coverage and signal strength in indoor locations (like buildings, homes etc.) since the coverage/signals do not penetrate inside buildings very well. Such poor coverage/signal strength in indoor locations causes coverage blackspots and diminished throughput that impacts the experience of users. The coverage blackspot is defined as a geographic area that experiences reduced cellular signal strength due to factors other than being too far from the macro base station/small cells. Some of the symptoms of the coverage blackspots are call drop-outs, digital garbling/noise during a call, difficulty hearing other caller, highly variable signal, slow data/internet speed, internet timeouts, or increased battery usage. Further, there are several causes for coverage blackspots, some of which can be planned for and minimized by the cellular network operator, and others that are invisible to the cellular network operator. Additionally, most of the indoor coverage blackspots are due to cost of deploying the macro/micro base stations and also due to the resource availability or deployment feasibility of the macro/micro base stations.

As a result, the cellular network operators are reinforcing one or more Wi-Fi access points or small cells, with backhaul of local area network (referred hereinafter as LAN) on optical fibre cable, deployed at multiple strategic locations points within the coverage of the macro base stations. This kind of network is generally termed as heterogeneous network (referred hereinafter as HetNet). Such small cells are low powered base station that includes micro cell base station, pico cell base station, and/or femto fell base station. Further, in order to provide last mile connectivity and to reduce coverage blackspots in the coverage area, the cellular network operators are deploying small cells and Wi-Fi access points over LAN in offices, malls, shopping complexes etc. Also, the Wi-Fi access points deployed in hotspot areas by the cellular network operators may be used to meet capacity requirements of the users. Another important reason for deploying the Wi-Fi access points is that majority of the services consumption takes place in the indoor location, thus it becomes imperative to provide better network coverage in the indoor locations as well. And, the cost and challenge to use macro base stations for providing indoor coverage are quite high. Considering tremendous growth and commercialization of the Wi-Fi access points, many of the cellular network operators are motivated to deploy the Wi-Fi access points for providing services to the users and also compelled to offload such services from the cellular network to the Wi-Fi access points for seamless user experience.

Moreover, the 3GPP standard defines two types of access: trusted and untrusted non-3GPP access. Non-3GPP access includes access from Wi-Fi access points, WiMAX, fixed and CDMA networks. The trusted non-3GPP access is often assumed to be the cellular network operator-built Wi-Fi access with encryption in the Wi-Fi radio access network (RAN) and a secure authentication method. In the trusted non-3GPP access, the user equipment is connected through a TWAG (Trusted Wireless Access Gateway) in the Wi-Fi core. The TWAG is in turn connected directly with the P-GW (Packet Gateway) in an Evolved Packet Core (EPC) through a secure tunnel (such as GTP, MIP, IPSEC or PMIP).

Currently, in order to serve large number of users, there has been technical challenge in providing multiple unique identifiers associated with the Wi-Fi access points connected to the LAN in a broadband connection and it is also difficult to control the bandwidth as per the unique identifiers. Further, it is also difficult to offload/route the service or the network traffic associated with the multiple user equipments from the cellular network to the trusted public/private Wi-Fi access points connected on the LAN with the fibre backhaul or vice versa and that without impacting the user experience. Furthermore, there has been difficulty to categorize the multiple users based on the multiple unique identifiers with individual subscription plans. It is also difficult to segregate public unique identifiers of the trusted public Wi-Fi access points and private unique identifiers of the trusted private Wi-Fi access points with different subscription plans for their own consumption of the services from their respective data/voice plans and that without impacting data pack or speed of a host/owner/facilitator of the service.

Therefore, in view of above-mentioned drawbacks, there is a need for an efficient and effective approach for providing multiple unique identifiers of the Wi-Fi access points to the users, offloading/routing user's traffic from the cellular network to the trusted public/private Wi-Fi access points, and categorizing the multiple users based on the multiple unique identifiers.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for routing network traffic associated with at least one user equipment, the method being performed by a routing device, the method comprising: providing at least two wireless networks, wherein the at least two wireless networks are at least one of a public wireless network and a private wireless network, each of the at least two wireless networks has a unique service set identifier, the unique service set identifier is one of a public unique service set identifier and a private unique service set identifier, and the unique service set identifier has a corresponding gateway connected to a core network; establishing a connection between the at least one user equipment and one of the at least two wireless networks, wherein the connection is established using the unique service set identifier of one of the at least two wireless networks, the connection is established in an event the routing device receives a request from the at least one user equipment to avail at least one service, and receiving the network traffic from the at least one user equipment through one of the at least two wireless networks in an event the at least one user equipment avails the at least one service; categorizing the network traffic received from the at least one user equipment, wherein the categorisation is based on the unique service set identifier; routing the network traffic from the routing device to the corresponding gateway based on the categorization, wherein the routing device is connected to the core network.

Embodiments of the present invention may relate to a routing device for routing network traffic associated with at least one user equipment, the routing device comprising: a network management module configured to: provide at least two wireless networks, wherein the at least two wireless networks are at least one of a public wireless network and a private wireless network, each of the at least two wireless networks has a unique service set identifier, the unique service set identifier is one of a public unique service set identifier and a private unique service set identifier, and the unique service set identifier has a corresponding gateway connected to a core network; a communication module configured to establish a connection between the at least one user equipment and one of the at least two wireless networks, wherein the connection is established using the unique service set identifier of one of the at least two wireless networks, and the connection is established in an event the router receives a request from the at least one user equipment to avail at least one service; a traffic module configured to: receive the network traffic from the at least one user equipment through one of the at least two wireless networks in an event the at least one user equipment avails the at least one service, and categorize the network traffic received from the at least one user equipment, wherein the categorisation is based on the unique service set identifier; and a routing module configured to route the network traffic from the router to the corresponding gateway based on the categorization, wherein the router is connected to the core network.

BRIEF DESCRIPTION OF THE DRAWINGS

The accompanying drawings, which are incorporated herein, and constitute a part of this present invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1A:
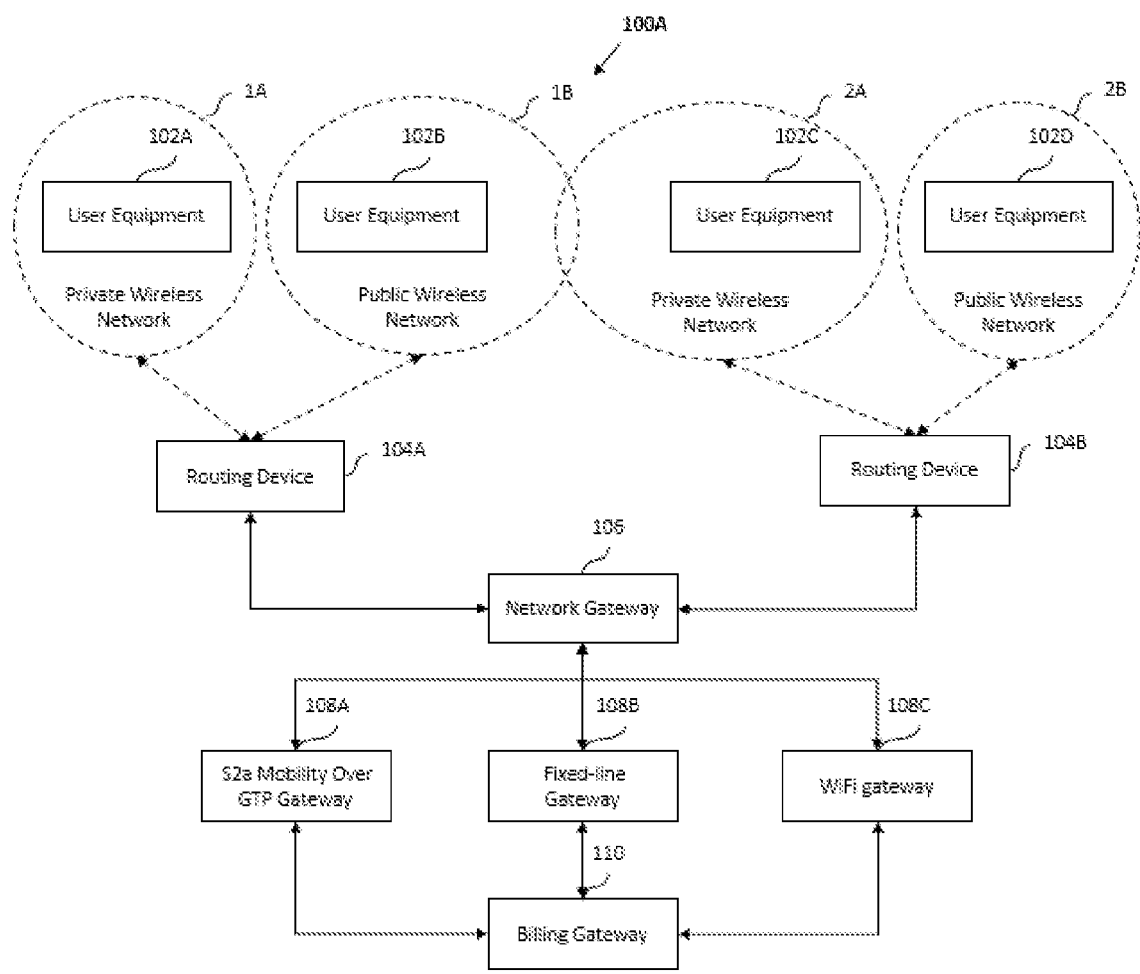
FIG. 1A illustrates an exemplary system architecture [100A] for categorizing and routing network traffic by a routing device, in accordance with an embodiment of the present invention.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for categorizing and routing network traffic associated with at least one user equipment, wherein the categorization of the network traffic is based on unique service set identifier of the one of a public wireless network and a private wireless network.

As used herein, the network traffic may refer to the outgoing traffic/packets generated by the at least one user equipment while availing at least one service or incoming traffic/packets generated by a core network while providing the at least one service to the at least one user equipment. Such network traffic may include traffic/packets of the at least one service including, but not limited to, a data service, a voice call service, a video call service, a voice over Wi-Fi (referred hereinafter as VoWi-Fi) voice call service, a VoWi-Fi video call service and any such service obvious to a person skilled in the art.

As used herein, the private wireless network may refer to a trusted private wireless network broadcasting at least one private unique service set identifier in the air. Such private wireless network may be created/provided by a Wi-Fi access point/routing device, wherein the Wi-Fi access point/routing device is connected to the core network through a wired connection. Further, the at least one user equipment may avail the at least one service by connecting to the private wireless network using the private unique service set identifier.

As used herein, the public wireless network may refer a trusted public wireless network broadcasting at least one public unique service set identifier in the air. Such public wireless network may be created/provided by the Wi-Fi access point/routing device, wherein the Wi-Fi access point/routing device is connected to the core network through the wired connection. Further, the at least one user equipment may avail the at least one service by connecting to the public wireless network using the public unique service set identifier. Such trusted public/private wireless network may be deployed and controlled by a cellular network operator in indoor locations or any such location where there is no cellular network or the cellular network is weak. Thereby, the public/private wireless network may provide extended coverage of the cellular network in such location to the at least one user equipment.

As used herein, the user equipment may be a computing device that may avail the at least one service by latching to at least one of a macro base station of the core network, a small cell and the Wi-Fi access point/routing device. The user equipment may have a processor, a display, a memory and an input means such as a hard keypad and/or a soft keypad. The user equipment may include, but not limited to, a mobile phone, a tablet, a wearable device, a phablet, a personal digital assistance and any such device obvious to a person skilled in the art.

As used herein, the core network may refer to any cellular or wireless network including, but not limited to, 5G network, Long-Term Evolution (LTE) network and a Global System for Mobile communication (GSM) network, that provides the cellular or wireless cellular network to the at least one user equipment.

As used herein, the Wi-Fi access point/routing device may refer to a device connected to the core network through the high-speed backhaul wired connection (such as a local area network (LAN) connection with optical fibre cable/FTTx (fibre to the X), unlicensed band radio (UBR), microwave, satellite, point-to-multipoint/peer-to-peer wireless link, Wi-Fi, millimetre-wave multi-node wireless backhaul) and providing at least one of the public wireless network and the private wireless network to the at least one user equipment. In other words, the Wi-Fi access point/routing device provides extended core/cellular network coverage (through at least one of the public wireless network and the private wireless network) to the at least one user equipment, especially in indoors locations. Also, the Wi-Fi access point/routing device may operate using conventional wireless technologies such as 802.11 a/b/g/n/ac/ah. Such Wi-Fi access point/routing device may include, but not limited to, a router, a customer premise equipment (CPE), an optical network terminal (ONT), a modem, a cloud terminal, and any such device that is obvious to a person having ordinary skilled in the art.

As illustrated in FIG. 1A, the present invention illustrates an exemplary system architecture [100A] for categorizing and routing network traffic by a routing device, in accordance with an embodiment of the present invention. The exemplary system architecture [100A] in FIG. 1A depicts: a routing device [104] connected to a network gateway [106] of a core network through wired connections, wherein the routing device [104] provides at least one of a private wireless network [1A/2A] and a public wireless network [1B/2B] to at least one user equipment [102] to avail at least one service. In a preferred embodiment, the routing device [104] is connected to the core network through a local area network (LAN) connection on optic fiber cables and may provide cellular wireless network to the at least one user equipment [102]. Further, the routing device [104] may broadcast at least one of a private unique service set identifier associated with the private wireless network [1A/2A] and a public unique service set identifier associated with the public wireless network [1B/2B]. Such public wireless network [1B/2B] and the private wireless network [1A/2A] may be at least one of a virtual network and a physical network. Further, throughout the specification, the reference numeral [102] includes any/all of the four user equipments [102A/102B/102C/102D] as depicted in the FIG. 1A and FIG. 1B. Similarly, the reference numeral [104] includes any/all of the two routing devices [104A/104B] as depicted in the FIG. 1A and FIG. 1B. Also, the reference numeral [108] includes any/all of the six gateways [108A-108F] as depicted in the FIG. 1A and FIG. 1B.

As seen in the non-limiting/exemplary FIG. 1A and explained in the non-limiting/exemplary Table 1 below, the routing device [104A] may broadcast private unique service set identifier [SSID-1A] and public unique service set identifier [SSID-1B] while providing the private wireless network [1A] and the public wireless network [1B], respectively. Similarly, the routing device [104B] may broadcast private unique service set identifier [SSID-2A] and public unique service set identifier [SSID-2B] while providing the private wireless network [2A] and the public wireless network [2B], respectively. Further, the user equipment [102A] is connected to the private wireless network [1A], the user equipment [102B] is connected to the public wireless network [1B], the user equipment [102C] is connected to the private wireless network [2A], the user equipment [102D] is connected to the private wireless network [2B], wherein the private wireless network [1A] and the public wireless network [1B] is provided by the routing device [104A] and the private wireless network [2A] and the public wireless network [2B] is provided by the routing device [104B]. Also, this is well-understood by a person having ordinary skilled in the art that any number of user equipment [102] may get connected to any of the private wireless network and the public wireless network through the routing device [104]. Further, it is also well understood by a person having ordinary skilled in the art that the routing device [104] may create one or more private wireless network or public wireless network. For instance, the routing device [104] may only create one private wireless network or may only create a single public wireless network or may create two private wireless networks, or two public wireless networks or any number/combination of such wireless networks.

TABLE 1

| Type of Wireless Network | Unique Service Set Identifier of Wireless Network | Connected User Equipment | Routing Device |
| --- | --- | --- | --- |
| Private - 1A | SSID-1A | 102A | 104A |
| Public - 1B | SSID-1B | 102B | 104A |

TABLE 1-continued

| Type of Wireless Network | Unique Service Set Identifier of Wireless Network | Connected User Equipment | Routing Device |
|---|---|---|---|
| Private - 2A | SSID-2A | 102C | 104B |
| Public - 2B | SSID-2B | 102D | 104B |

Further, when the at least user equipment [102] is connected a macro base station/small cell of the core network and comes in a vicinity of one of the private wireless network [1A/2A] and the public wireless network [1B/2B], the at least user equipment [102] may transmit a service request to the routing device [104] for availing the at least one service through one of the private wireless network [1A/2A] and the public wireless network [1B/2B]. In such scenario, the at least user equipment [102] may latch/connect to one of the private wireless network [1A/2A] using the private unique service set identifier and the public wireless network [1B/2B] using the public unique service set identifier. The latching of the at least one user equipment [102] includes authentication of the at least one user equipment [102] to one of the private wireless network [1A/2A] and the public wireless network [1B/2B] using Extensible Authentication Protocol (referred hereinafter as EAP). The latching of the at least one user equipment [102] may be based on information such as public land mobile network (PLMN), mobile country codes/mobile network code (MCC/MNC), network access identifier (NAI) etc. Thereby, the at least user equipment [102] may connect with one of the private wireless network [1A/2A] and the public wireless network [1B/2B] using the routing device [104] and thus, the at least user equipment [102] may establish connection with one of the private wireless network [1A/2A] and the public wireless network [1B/2B] via the routing device [104].

Once the at least user equipment [102] connects to/establishes connection with one of the private wireless network [1A/2A] and the public wireless network [1B/2B], the at least user equipment [102] may start availing the at least one service through one of the private wireless network [1A/2A] and the public wireless network [1B/2B] via the routing device [104]. While the at least user equipment [102] avails the at least one service through one of the private wireless network [1A/2A] and the public wireless network [1B/2B], the routing device [104] may receive network traffic from the at least user equipment [102]. On receiving the network traffic from the at least user equipment [102], the routing device [104] may identify the unique service set identifier of the private/public wireless network [1A/2A/1B/2B], using which the at least user equipment [102] avails the at least one service. Upon identification of the unique service set identifier of one of the private wireless network [1A/2A] and the public wireless network [1B/2B], the routing device [104] may categorize the network traffic based on the unique service set identifier (i.e. private unique service set identifier and/or the public unique service set identifier). The routing device [104] may also categorize the network traffic based on at least one of internet protocol (IP) range and virtual routing function (VRF).

After categorizing the network traffic of the at least user equipment [102], the routing device [104] may route the network traffic of the at least user equipment [102] to a corresponding gateway [108] based on the categorization of the network traffic, through the network gateway [106]. Further, the corresponding gateway [108] is responsible for handling the network traffic associated with the private/public unique service set identifier of one of the private wireless network [1A/2A] and the public wireless network [1B/2B]. In other words, each of the unique service set identifier has a corresponding gateway [108] connected to the core network.

In an exemplary embodiment, the routing device [104] may route the network traffic of the at least user equipment [102] to a S2a Mobility Over GTP (SaMOG) gateway [108A] in an event the network traffic is associated with the public unique service set identifier of the public wireless network [1B/2B]. Further, the routing device [104] may route the network traffic of the at least user equipment [102] to a fixed line gateway [108B] in an event the network traffic is associated with the private unique service set identifier of the private wireless network [1A/2A] (i.e. a broadband connection). Furthermore, the routing device [104] may route the network traffic of the at least user equipment [102] to a Wi-Fi gateway [108C] in an event the network traffic is associated with the public unique service set identifier of the public wireless network [2B/2B] (i.e. a public hotspot connection). In this way, the routing device [104] may also be responsible for seamless offloading of the network traffic associated with the at least one user equipment [102] from the core network to the wireless cellular network [1A/1B/2A/2B] provided by the routing device [104].

The billing gateway [110] is configured to bill/charge the at least user equipment [102] based on the at least one service availed by the at least user equipment [102] through the corresponding gateway [108A-108C].

Figure 1B:
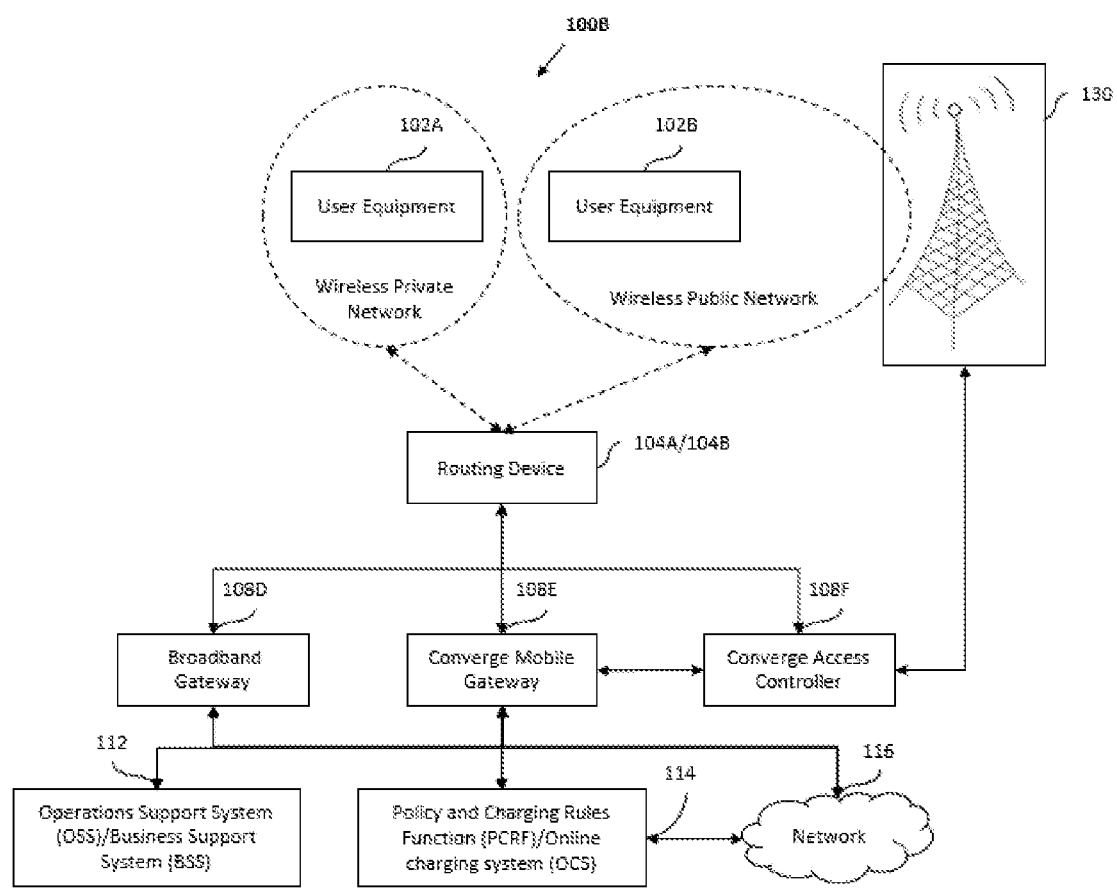
FIG. 1B illustrates an exemplary system architecture [100B] for categorizing and routing network traffic by a core network, in accordance with an embodiment of the present invention.

As illustrated in FIG. 1B, the present invention illustrates an exemplary system architecture [100B] for categorizing and routing network traffic by the core network, in accordance with an embodiment of the present invention.

With respect to the exemplary system architecture [100B], the routing device [104] receives network traffic from the at least one user equipment [102] and the routing device [104] subsequently transmits the network traffic to a broadband gateway [108D]. In a preferred embodiment, the broadband gateway [108D] is placed in the core network and may be responsible for identifying and categorizing the network traffic based on the unique service set identifier (i.e. private unique service set identifier and/or the public unique service set identifier). The broadband gateway [108D] may also be responsible for seamless offloading of the network traffic associated with the at least one user equipment [102] from the core network to the wireless cellular network [1A/1B/2A/2B] provided by the routing device [104].

The converge mobile gateway [108E] may include the S2a Mobility Over GTP (SaMOG) Gateway [108A], a packet gateway and an evolved packet data gateway (ePDG). Any network traffic from at least one of the public wireless network [1B/2B] and the private wireless network [1A/2A] may get converged at the converge mobile gateway [108E] and handled by the converge mobile gateway [108E]. Further, the converge mobile gateway [108E] may be a group gateways or a single gateway that is responsible for anchor session of each or multiple technologies like MSC, BNG, 5G Core (UP/DP).

The converge access controller [108F] may be a component or group of components that monitor the core cellular network as well as the wireless network and one or more parameters associated with the at least one user equipment [102] (such as coverage, throughput, latency, packet loss, jitter, battery, public land mobile network (PLMN), SSID etc.) in order to trigger the network traffic offloading between the core cellular network and the wireless network or vice-versa. In an embodiment, the converge access controller [108F] may be access network discovery and selection function (ANDSF) or Hotspot2.0. Further, other parameters may also be taken into consideration such as network access identifier (NAI) realm, 3GPP cellular PLMN, roaming consortium list, domain name, venue name, venue info, cellular operator friendly name, IP address type availability information, WAN metrics, connection capability, operating class indication, network authentication type information, HE-SSID, access network type field, internet available field, base station subsystem (BSS) load information element, Quality of Service (QoS) etc.

The operations support system (OSS)/business support system (BSS) [112] may be responsible for providing convergence of networks (such as cellular, FTTx, wireless etc) for convergent billing and operations. The operations support system (OSS)/business support system (BSS) [112] may also be responsible for fulfilment, assurance and billing processes for converged communication and sensor services. Also, the CRM and optimizing of customer experience as well as visibility of coverage of telecommunications management network (TMN), EMS/NMS, OSS network operation centre, simple network management protocol (SNMP) and management of the converged networks, may be handled by the operations support system (OSS)/business support system (BSS) [112]. The converge OSS/BSS [112] may support innovation culture and maintain product catalogue driving order manager and accurate billing module for not limiting new services over-the-top (OTT), SDN/NFV, containers, 5G, IoT etc. on basis of wireless or cellular technologies.

The policy and charging rules function (PCRF)/online charging system (OCS) [114] may also be responsible for symbolizing converged policy server, intelligent network system, voice/data charging and policy server. Through the convergence with multi-technology policy and charging systems, the converge PCRF/OCS may provide a uniform policy/service management platform and a uniform customer care platform for prepaid subscribers, postpaid subscribers. The policy and charging rules function (PCRF)/online charging system (OCS) [114] may also provide a converge billing/charging on various platform and flexible charging policies for multiple telecommunication services, such as voice, short message, and data services.

The internet [116] may be responsible for connecting each of the gateways [108] to the core network and may further connect at least one user equipment [102] with the wireless network and/or the cellular network and the gateways [108].

Figure 2:
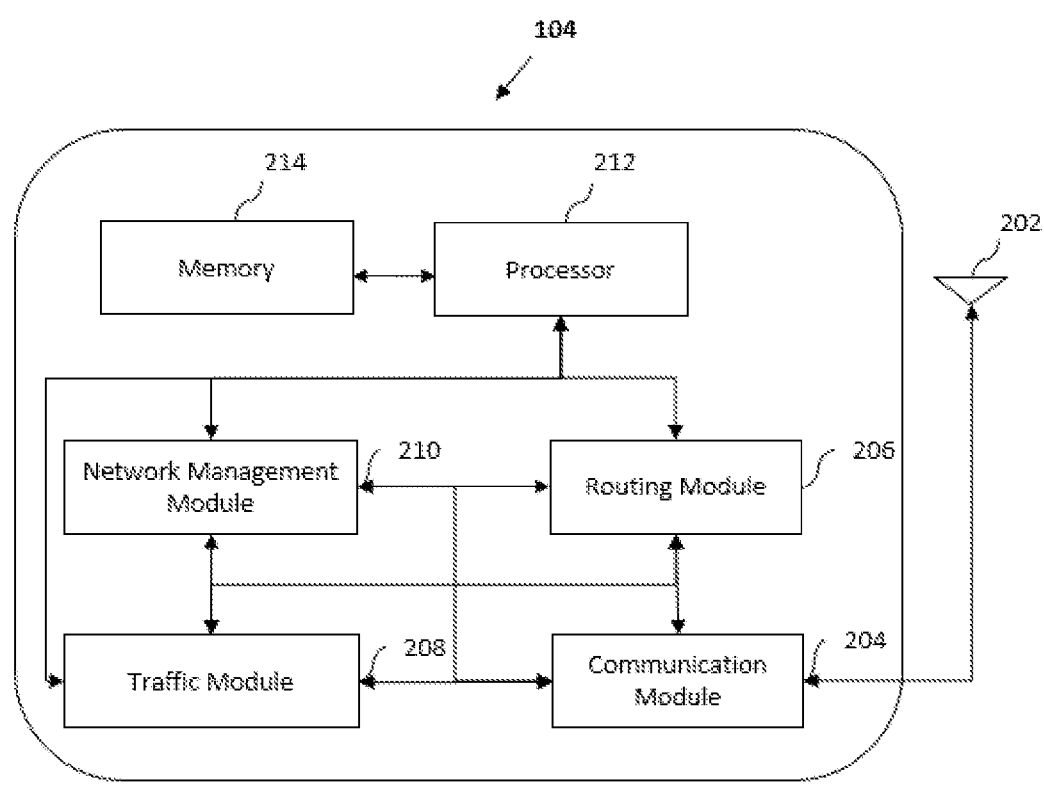
FIG. 2 illustrates an exemplary routing device [104], in accordance with an exemplary embodiment of the present invention.

As illustrated in FIG. 2, the present invention illustrates an exemplary routing device [104], in accordance with an exemplary embodiment of the present invention, the routing device [104] comprising, but not limited to: an antenna [202], a communication module [204], a routing module [206], a traffic module [208], a network management module [210], a processor [212] connected to a memory [214].

The communication module [204] may be configured to provide the at least one of the private wireless network [1A/2A] and the public wireless network [1B/2B] to the at least one user equipment [102] through the antenna [202]. The communication module [204] may also be configured to broadcast at least one of the private unique service set identifier of the private wireless network [1A/2A] and the public unique service set identifier of the public wireless network [1B/2B] through the antenna [202]. In an embodiment, the communication module [204] may be a transceiver. The communication module [204] may further be configured to communicate with the at least one user equipment [102] through the antenna [202]. Such communication may include, but not limited to, authenticating the at least one user equipment [102], establishing the connection between the at least one user equipment [102] and one of the public wireless network [1B/2B] and the private wireless network [1A/2A], and receiving the network traffic from the at least one user equipment [102].

The traffic module [208] may be configured to receive the network traffic of the at least one user equipment [102] from the communication module [204] and may categorize the network traffic based on the unique service set identifier (i.e. private unique service set identifier and/or the public unique service set identifier). Also, the routing device [104] may categorize the network traffic based on at least one of the internet protocol (IP) range and the virtual routing function (VRF). Further, the traffic module [208] may be configured to handle the egress (outgoing) traffic as well as ingress (incoming) traffic.

The routing module [206] may be configured to route the network traffic to the corresponding gateway [108] based on the categorization of the network traffic, through the network gateway [106]. The routing module [206] may be configured to receive the categorized network traffic from the traffic module [208]. Further, the corresponding gateway [108] is responsible for handling the network traffic associated with the private/public unique service set identifier of one of the private wireless network [1A/2A] and the public wireless network [1B/2B]. In other words, each of the unique service set identifier has the corresponding gateway [108] connected to the core network. Moreover, the routing module [206] may receive and transmit data of varied protocols, convert the data protocols to an internet protocol for routing on an IP or Non-IP network (cellular/wireless network). The routing module [206] may have a number of interfaces through which SATCOM protocol (Satellite Communication), UHF-VHF (ultra-high frequency/very high frequency) protocol, digital data protocols, serial data protocols, common data link protocols, push-to-talk data protocols, analog/digital voice and voice internet protocol, and other internet protocol data may be received, routed, and transmitted. Hardware, firmware, and/or software logic for each of the components convert analog or other digital data to internet protocol, verify the classification level of data, protect the classification level of the data, encrypt the data for routing through a secure routing system a destination interface.

The network management module [210] may be configured to provide the at least two wireless networks [1A/1B/2A/2B] to the at least one user equipment [102], wherein the at least two wireless networks are at least one of the public wireless network [1B/2B] and the private wireless network [1A/2A]. Such public wireless network [1B/2B] and the private wireless network [1A/2A] may be at least one of the virtual network and the physical network. The network management module [210] may be configured to manage and handle one or more policies related to all of the wireless networks [1A/2A/1B/2B]. Moreover, the network management module [210] may be configured to control and monitor network communications i.e. with policy control based on various parameters, including IP address, VLAN, network ports, traffic directions etc.

The processor [212] may be communicatively coupled with the communication module [204], the routing module [206], the traffic module [208], the network management module [210] and may be configured to perform one or more operations. Further, the routing module [206], the traffic module [208], the network management module [210] work in conjunction with the processor [212]. The processor [212] as used herein may include, but is not limited to, a processor or set of processors such as a microprocessor, a multi-core microprocessor, a digital signal processor, a collection of electronic circuits, or a combination thereof and may be configured to perform operations/functions.

The memory [214], coupled to the processor [212], may be configured to store and manage multiple data sets including the unique service identifier/s of the at least one of the public wireless network [1B/2B] and the private wireless network [1A/2A]. The memory [214] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The routing device [104] may also comprise an automatic location management module responsible for handling location information of the at least one user equipment [102], an authentication module configured to handle authentication of the at least one user equipment [102], a bandwidth negotiation module configured to handle the bandwidth allocated to the at least one user equipment [102]. Also, the routing device [104] may also handle support operations, administration and maintenance activities.

The routing device [104] or the core network (based on some default settings or predetermined rules) may employ one or more routing algorithms to route the network traffic. Alternatively, a user may also be provided an option to choose a particular routing algorithm to route the network traffic. Few examples of optimized routing algorithms include, but are not limited to, least cost routing (e.g., a routing path with least cost), bandwidth intensive routing (e.g., a routing path to maximize bandwidth and Quality of Service (QoS), based on the application type), least congestion routing (e.g., a routing path to reduce dropping of traffic/packets, e.g., to support voice services), customer routing (e.g., a routing path that stays on the core network as much as possible across networks), and any such other routing algorithm that is obvious to a person skilled in the art.

The present invention facilitates the routing device [104] to support the following protocols and services:
1) The protocol to connect with next gateway [protocols like ethernet over generic routing encapsulation (EoGRE), generic routing encapsulation (GRE), Layer 2 virtual private network (L2VPN), control and provisioning of wireless access points (CAPWAP) etc.]
2) Radius protocol for SIM/user equipment authentication (protocols like required extensible authentication protocol (EAP), EAP-authentication and key agreement (EAP-AKA), EAP-AKA', EAP-subscriber identity module (EAP-SIM), wireless internet service provider (WISP), certificate based etc.)
3) Seamless device protocols like Hotspot2.0 (HS2.0) releases to publish public land mobile network (PLMN) information or any other alternate protocol
4) Categorize network traffic per unique service set identifier (as explained in FIG. 1A and FIG. 1B)
5) Publish location information like location group name (equivalent to wireless network group name), identifier of the at least one user equipment [102], unique service set identifier on radius messages (or other authentication flow)
6) Limit the number of subscribers per router, per unique service set identifier etc
7) Bandwidth control per unique service set identifier (as explained below)

Figure 3:
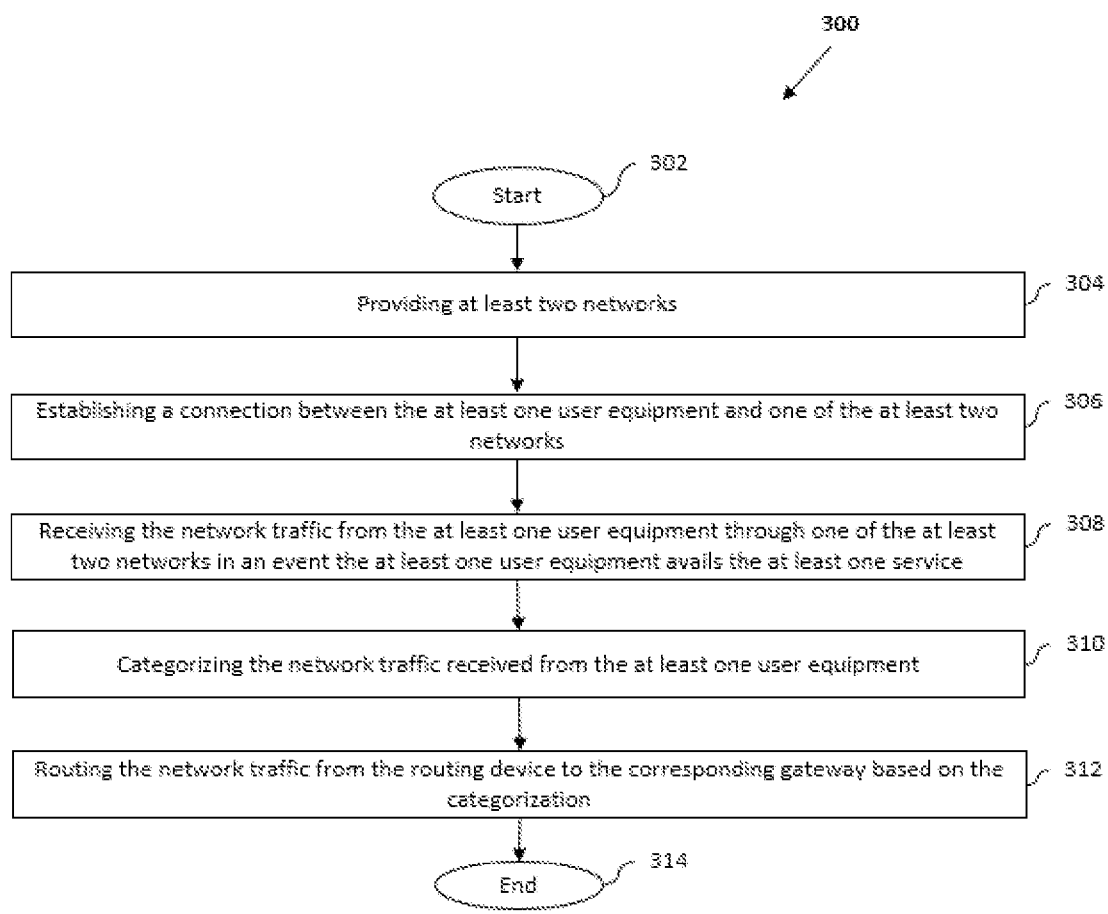
FIG. 3 illustrates an exemplary method flow diagram [300] for categorizing and routing network traffic associated with at least one user equipment, in accordance with an embodiment of the present invention.

As illustrated in FIG. 3, the present invention illustrates an exemplary method flow diagram [300] for categorizing and routing network traffic associated with the at least one user equipment, in accordance with an embodiment of the present invention, wherein the method being performed by the routing device [104]. The method flow initiates at step 302.

At step 304, the routing device [104] may provide the private wireless network [1A] and the public wireless network [1B] to the at least one user equipment [102] and may broadcast the private unique service set identifier and the public unique service set identifier of the private wireless network [1A/2A] and the public wireless network [1B/2B], respectively. Further, each of the public/private unique service set identifier has the corresponding gateway [108] connected to the core network.

At step 306, the routing device [104] may establish the connection between the at least one user equipment [102] and at least one of the private wireless network [1A/2A] and the public wireless network [1B/2B] wherein, the connection is established with one of the private wireless network [1A/2A] using the private unique service set identifier and the public wireless network [1B/2B] using the public unique service set identifier. Further, the connection is established in an event the routing device [104] receives the service request from the at least one user equipment [102] to avail at least one service.

At step 308, the routing device [104] may receive network traffic from the at least user equipment [102], while the at least user equipment [102] avails the at least one service through one of the private wireless network [1A/2A] and the public wireless network [1B/2B].

At step 310, the routing device [104] may identify the unique service set identifier using which the at least user equipment [102] avails the at least one service. Upon identification of the unique service set identifier of one of the private wireless network [1A/2A] and the public wireless network [1B/2B], the routing device [104] may categorize the network traffic based on the unique service set identifier (i.e. private unique service set identifier and/or the public unique service set identifier).

At step 312, the routing device [104] may route the network traffic of the at least user equipment [102] to the corresponding gateway [108] based on the categorization of the network traffic, through the network gateway [106]. Further, the corresponding gateway [108] is responsible for handling the network traffic associated with the private/public unique service set identifier of one of the private wireless network [1A/2A] and the public wireless network [1B/2B]. In other words, each of the unique service set identifier has the corresponding gateway [108A-108C] connected to the core network. Then, the method [300] may end at step 314.

Figure 4:
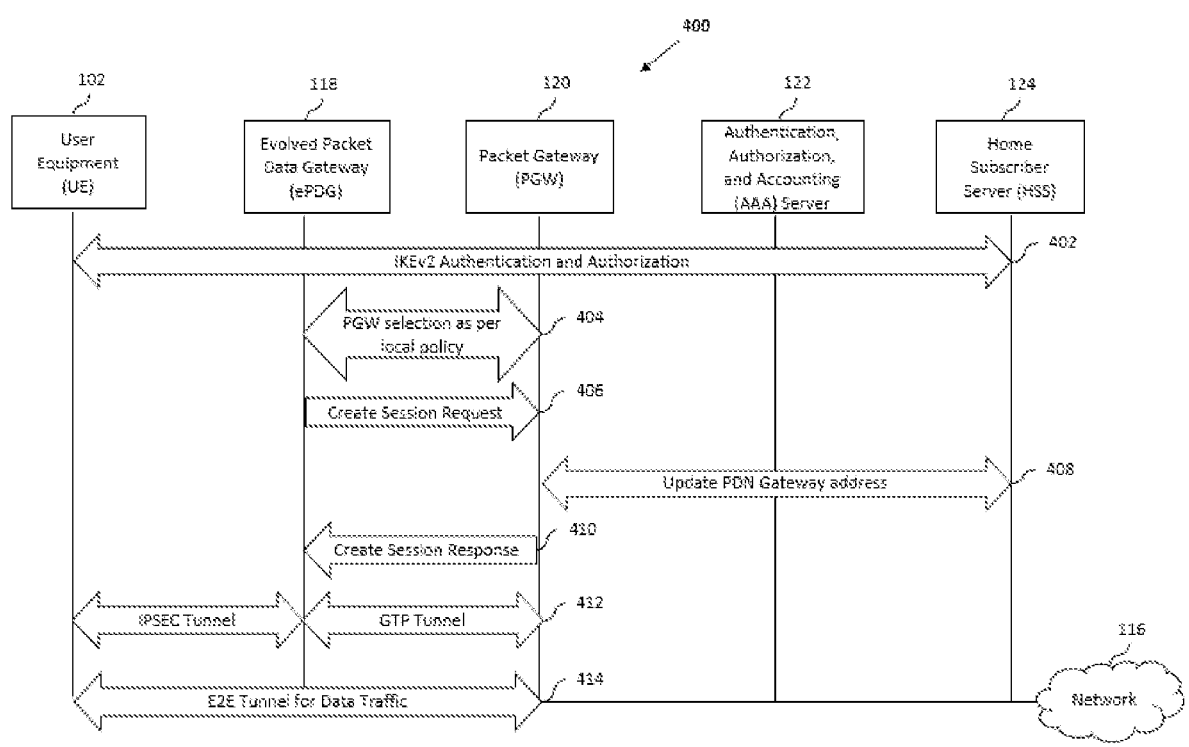
FIG. 4 illustrates an exemplary signaling flow diagram [400] for offloading a data service from a core network to a wireless network, in accordance with an embodiment of the present invention.

As illustrated in FIG. 4, the present invention illustrates an exemplary signaling flow diagram [400] for offloading network traffic associated with a data service from the core network to one of the private wireless network [1A/2A] and the public wireless network [1B/2B], in accordance with an embodiment of the present invention.

At step 402, the at least one user equipment [102] may get authenticated (Internet Key Exchange version 2, IKEv2) to the routing device [104] or the core network using a home subscriber server (HSS) [124] on a trusted interface. Such authentication is performed in an event the at least one user equipment [102] transmits a connection request. Further, the at least one user equipment [102] may scan the availability of the wireless network and/or the core network and the at least one user equipment [102] may latch to each of these networks solely or together on the basis of signal strength of the networks, priority, policy, authentication method and other parameters. In a preferred embodiment, the at least one user equipment [102] select the wireless network over the core cellular network. Alternatively, the at least one user equipment [102] or the core network select the network for offloading traffic through either of the cellular network or wireless network.

At step 404, an encapsulation or a tunnel is created between an evolved packet data gateway (ePDG) [118] and a packet gateway (PGW) [120]. In another embodiment, a direct tunnel may be created between the at least one user equipment [102] and the converge mobile gateway [108E] for categorising the network traffic and routing the network traffic based on the virtual LAN. Further, the evolved packet data gateway (ePDG) may select the packet gateway (PGW) [120] as per local policy. Such local policy may be configured dynamically or statically for the encapsulation & tunneling using which the evolved packet data gateway (ePDG) select the gateway on the basis of technology or end-point.

At step 406, the evolved packet data gateway (ePDG) [118] may create a session request and transmit the session request to the packet gateway (PGW) [120] for providing the at least one service to the at least one user equipment [102]. Further, the packet gateway (PGW) [120] may assign the IP and name of the routing device [104] to the at least one user equipment [102].

At step 408, the packet gateway (PGW) [120] may update packet data network (PDN) Gateway address to the home subscriber server (HSS) [124].

At step 410, the packet gateway (PGW) [120] may create a session response and transmit the session request to the evolved packet data gateway (ePDG) [118].

At step 412, an IPSEC tunnel is created between the at least one user equipment [102] and the evolved packet data gateway (ePDG) [118]. Also, a GTP tunnel is created between the evolved packet data gateway (ePDG) [118] and the packet gateway (PGW) [120].

At step 414, an E2E tunnel (such as IPSec or EoGRE) is created between the at least one user equipment [102] and the packet gateway (PGW) [120] for offloading the network traffic associated with data traffic from the core network to one of the private wireless network [1A/2A] and the public wireless network [1B/2B] using the internet [116].

Figure 5:
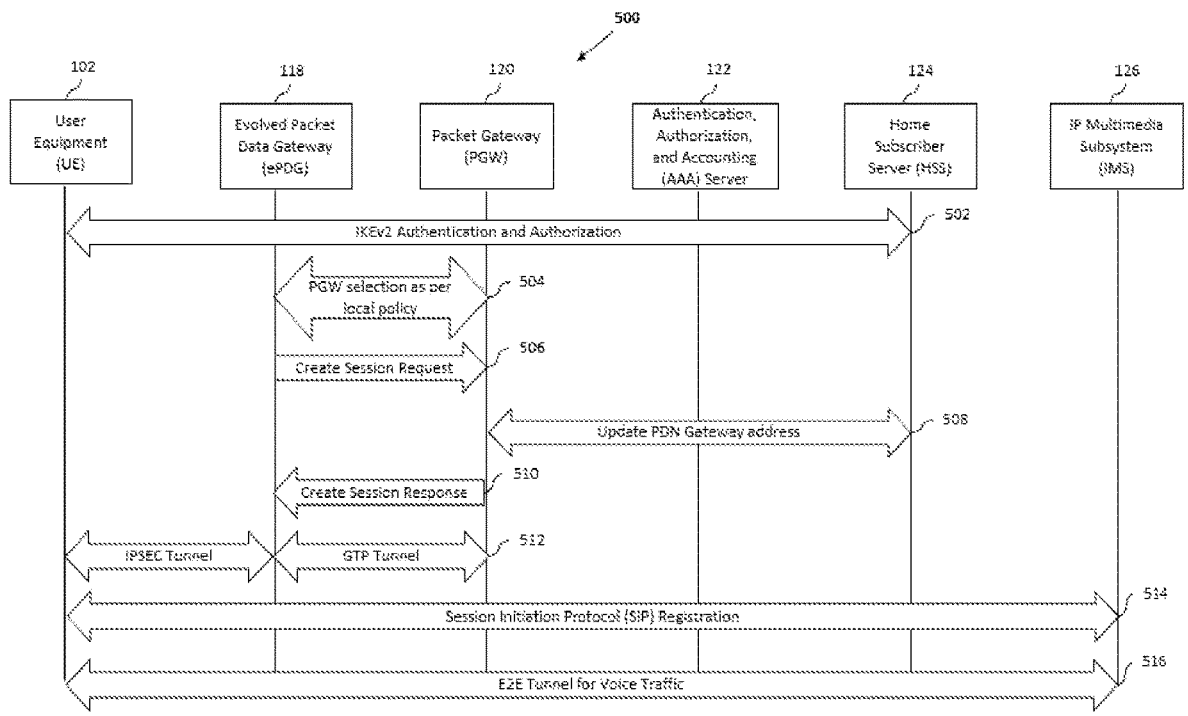
FIG. 5 illustrates an exemplary signaling flow diagram [500] for offloading a voice service from a core network to a wireless network, in accordance with an embodiment of the present invention.

As illustrated in FIG. 5, the present invention illustrates an exemplary signaling flow diagram [500] for offloading network traffic associated with a voice service from the core network to one of the private wireless network [1A/2A] and the public wireless network [1B/2B], in accordance with an embodiment of the present invention.

At step 502, the at least one user equipment [102] may get authenticated (IKEv2) to the routing device [104] or the core network using the home subscriber server (HSS) [124] on a trusted interface. Such authentication is performed in an event the at least one user equipment [102] transmits the connection request. Further, the at least one user equipment [102] may scan the availability of the wireless network and/or the core network and the at least one user equipment [102] may latch to each of these networks solely or together on the basis of signal strength of the networks, priority, policy, authentication method and other parameters. In a preferred embodiment, the at least one user equipment [102] select the wireless network over the core cellular network. Alternatively, the at least one user equipment [102] or the core network select the network for offloading traffic through either of the cellular network or wireless network.

At step 504, an encapsulation or a tunnel is created between the evolved packet data gateway (ePDG) [118] and the packet gateway (PGW) [120]. In another embodiment, a direct tunnel may be created between the at least one user equipment [102] and the converge mobile gateway [108E] for categorising the network traffic and routing the network traffic based on the virtual LAN. Further, the evolved packet data gateway (ePDG) may select the packet gateway (PGW) [120] as per local policy. Such local policy may be configured dynamically or statically for the encapsulation & tunneling using which the evolved packet data gateway (ePDG) select the gateway on the basis of technology or end-point.

At step 506, the evolved packet data gateway (ePDG) [118] may create a session request and transmit the session request to the packet gateway (PGW) [120]. Further, the packet gateway (PGW) [120] may assign the IP and name of the routing device [104] to the at least one user equipment [102].

At step 508, the packet gateway (PGW) [120] may update packet data network (PDN) Gateway address to the home subscriber server (HSS) [124].

At step 510, the packet gateway (PGW) [120] may create a session response and transmit the session request to the evolved packet data gateway (ePDG) [118] for providing the at least one service to the at least one user equipment [102].

At step 512, an IPSEC tunnel is created between the at least one user equipment [102] and the evolved packet data gateway (ePDG) [118]. Also, a GTP tunnel is created between the evolved packet data gateway (ePDG) [118] and the packet gateway (PGW) [120].

At step 514, a session initiation protocol (SIP) registration takes place between the at least one user equipment [102] and an IP multimedia subsystem (IMS) [126].

At step 516, with successful registration at the IP multimedia subsystem (IMS) [126], an E2E tunnel is created between the at least one user equipment [102] and the IP multimedia subsystem (IMS) [126] for offloading the network traffic associated with voice traffic from the core network to one of the private wireless network [1A/2A] and the public wireless network [1B/2B] using the internet [116].

Figure 6:
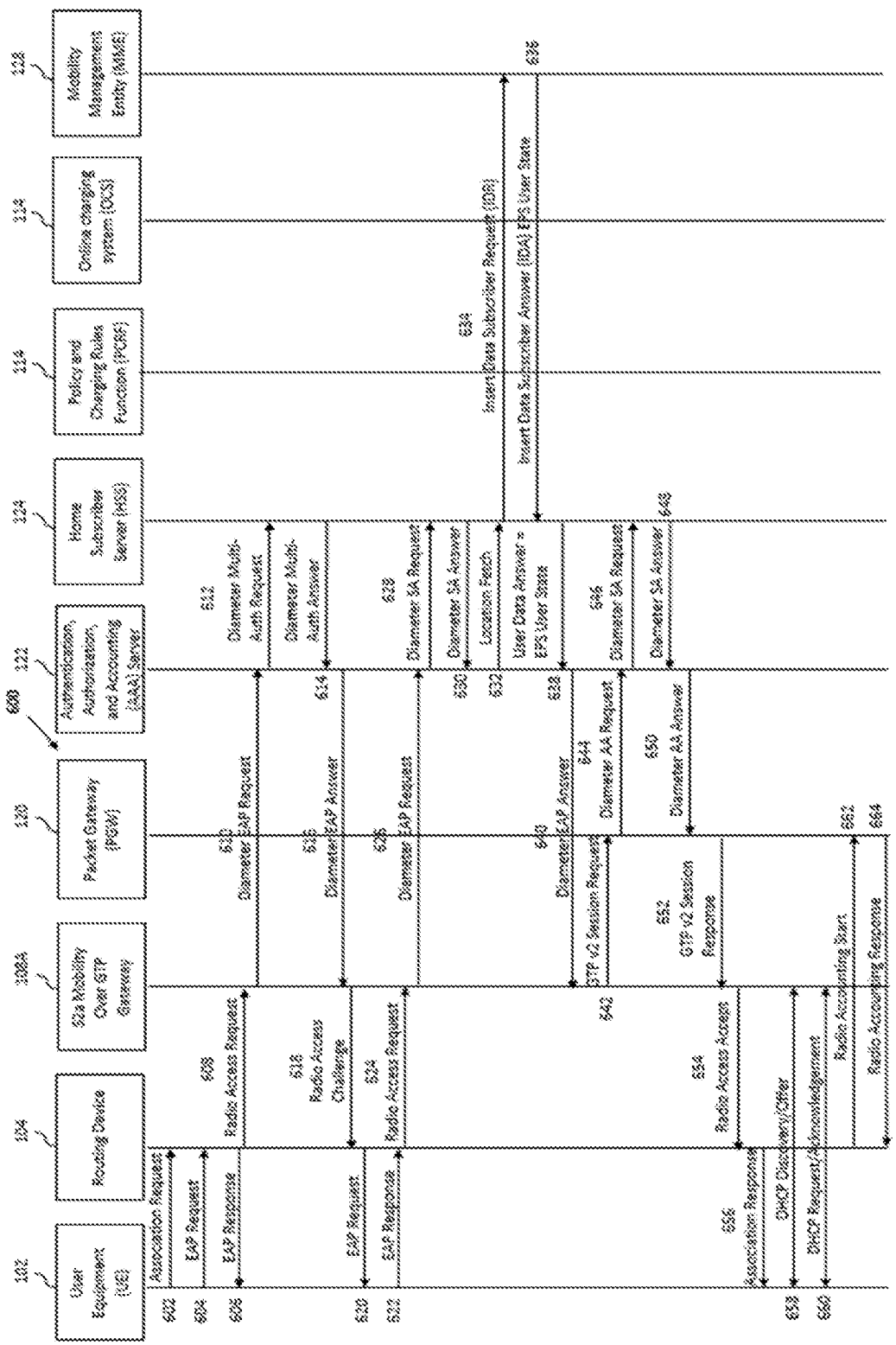
FIG. 6 illustrates an exemplary signaling flow diagram [600] for EAP AKA authentication of at least one user device with a routing device and a core network, in accordance with an embodiment of the present invention.

As illustrated in FIG. 6, the present invention illustrates an exemplary signaling flow diagram [600] for the EAP authentication of the at least one user equipment [102] with the core network, in accordance with an embodiment of the present invention.

At step 602, the at least one user equipment [102] may transmit the connection request to the routing device [104] for availing the at least one service. In an embodiment, the connection request may be an 802.11 association request.

At step 604, the at least one user equipment [102] may transmit an EAP request to the routing device [104] for identifying the at least one user equipment [102].

At step 604, in response, the routing device [104] may in turn transmit an EAP request to the at least one user equipment [102] on identification of the at least one user equipment [102].

At step 608, the routing device [104] may transmit a radio access request to the SaMOG gateway [108A]. Such radio access request may include, but not limited to, a user name (such as RootNAI), a unique identifier associated with the at least one user equipment [102], an information of a connection type (such as WLAN), and the EAP identification of the at least one user equipment [102].

At step 610, the SaMOG gateway [108A] may transmit a diameter EAP request to an authentication, authorization, and accounting (AAA) Server [122] through the packet gateway (PGW) [120]. Such diameter EAP request may include, but not limited to, the user name (such as RootNAI), the information of the connection type (such as WLAN), and the EAP identification of the at least one user equipment [102].

At step 612, the authentication, authorization, and accounting (AAA) Server [122] may transmit a diameter multi-authentication request to the home subscriber server [124]. Such diameter multi-authentication request may include, but not limited to, the user name (such as IMSI), and the information of the connection type (such as WLAN).

At step 614, the home subscriber server [124] in turn may transmit a diameter multi-authentication answer to the authentication, authorization, and accounting (AAA) Server [122]. Such diameter multi-authentication answer may include, but not limited to, the user name (such as IMSI), and authentication vector attributes.

At step 616, the authentication, authorization, and accounting (AAA) Server [122] may transmit a diameter EAP answer to the SaMOG gateway [108A]. The diameter EAP answer may include, but not limited to, the user name (such as RootNAI).

At step 618, the SaMOG gateway [108A] may further transmit a radio access challenge to the routing device [104] including, but not limited to, the user name (such as RootNAI).

At step 620, the routing device [104] may now transmit an EAP challenge request to the at least one user equipment [102].

At step 622, the at least one user equipment [102] may now transmit an EAP challenge response to the routing device [104].

At step 624, the routing device [104] transmit another radio access request to the SaMOG gateway [108A]. Such another radio access request may include, but not limited to, the user name (such as RootNAI) and the EAP of the challenge response of at least one user equipment [102].

At step 626, the SaMOG gateway [108A] may transmit another diameter EAP request to the authentication, authorization, and accounting (AAA) server [122] through the packet gateway (PGW) [120]. Such another diameter EAP request may include, but not limited to, the user name (such as RootNAI) and the EAP of the challenge response of at least one user equipment [102].

At step 628, the authentication, authorization, and accounting (AAA) Server [122] may transmit a diameter SA request to the home subscriber server (HSS) [124]. Such diameter SA request may include, but not limited to, the user name (such as IMSI), the information of the connection type (such as WLAN), and a type of SA (such as registration).

At step 630, the home subscriber server (HSS) [124] in turn may transmit a diameter SA answer to the authentication, authorization, and accounting (AAA) Server [122]. Such diameter SA answer may include, but not limited to, the user name (such as IMSI), and a profile of a subscriber associated with the at least one user equipment [102]. Such profile of the subscriber may include a Quality of Service (QoS) information, APN information etc.

At step 632, the authentication, authorization, and accounting (AAA) Server [122] also may transmit a request to the home subscriber server (HSS) [124] for fetching a location of the at least one user equipment [102].

At step 634, in response, the home subscriber server (HSS) [124] transmit an insert subscriber data request (IDR) to a mobility management entity (MME) [128].

At step 636, the mobility management entity (MME) [128] may transmit an insert subscriber data answer (IDA) to the home subscriber server (HSS) [124].

At step 638, when the home subscriber server (HSS) [124] receives the insert subscriber data answer (IDA) from the mobility management entity (MME) [128], the home subscriber server (HSS) [124] may transmit a user data answer (UDA) to the authentication, authorization, and accounting (AAA) server [122].

At step 640, when the authentication, authorization, and accounting (AAA) Server [122] receives the user data answer (UDA), the authentication, authorization, and accounting (AAA) server [122] may transmit a diameter EAP answer to the SaMOG gateway [108A]. The diameter EAP answer may include, but not limited to, the user name (such as RootNAI) and the profile of the subscriber.

At step 642, the SaMOG gateway [108A] may transmit a GPRS tunneling protocol (GTP) session request to the packet gateway (PGW) [120]. Such request may include, but not limited to, an international mobile subscriber identifier, a mobile station international subscriber directory number, the unique identifier of the wireless network [1A/2A/1B/2B], the information of the connection type (such as WLAN) etc.

At step 644, the packet gateway (PGW) [120] may transmit a diameter AA request to the authentication, authorization, and accounting (AAA) server [122]. Such diameter AA request may include, but not limited to, the user name, the information of the connection type (such as WLAN), and the type of SA.

At step 646, the authentication, authorization, and accounting (AAA) server [122] may transmit a diameter SA request to the home subscriber server (HSS) [124]. Such diameter SA request may include, but not limited to, the user name, the information of the connection type (such as WLAN), and the type of SA.

At step 648, the home subscriber server (HSS) [124] in response, may transmit a diameter SA answer to the authentication, authorization, and accounting (AAA) server [122] with a status. Such status may one of a success and an unsuccess status.

At step 650, the authentication, authorization, and accounting (AAA) server [122] in response, may transmit a diameter AA answer to the packet gateway (PGW) [120] along with the status.

At step 652, the packet gateway (PGW) [120] may transmit a GTP session response to the SaMOG gateway [108A]. Such response may include a PDN address.

At step 654, the SaMOG gateway [108A] may transmit a radio access accept response to the routing device [104]. The radio access accept response may include user name (such as RootNAI).

At step 656, the routing device [104] may transmit a connection response to the at least one user equipment [102]. Such connection response may be an 802.11 association response.

At step 658, the at least one user equipment [102] transmit a dynamic host configuration protocol (referred hereinafter as DHCP) discovery to the SaMOG gateway [108A] and in response, the SaMOG gateway [108A] may transmit a DHCP offer to the at least one user equipment [102].

At step 660, the at least one user equipment [102] transmit a DHCP request to the SaMOG gateway [108A] and in response, the SaMOG gateway [108A] may transmit a DHCP acknowledgement to the at least one user equipment [102].

At step 662, the routing device [104] may transmit a radius accounting start to the packet gateway (PGW) [120] and the packet gateway (PGW) [120].

At step 664, in return, the packet gateway (PGW) [120] may transmit a radius account response to the routing device [104].

As used herein, the SaMOG gateway [108A], the authentication, authorization, and accounting (AAA) server [122], the evolved packet data gateway (ePDG) [118], the packet gateway (PGW) [120], the home subscriber server (HSS) [124], the IP Multimedia Subsystem (IMS) [126], the mobility management entity (MME) [128], the converge mobile gateway [108E], the converge access controller [108F], the operations support system (OSS)/business support system (BSS) [112], the policy and charging rules function (PCRF)/online charging system (OCS), the fixed line gateway [108B], the Wi-Fi gateway [108C], the network gateway [106], the billing gateway [110], and anu such gateway are part/components of the core network. Such gateways are connected to each other through wired connections using one or more optical fiber cables, wires, cables etc.

The present invention encompasses a system and a method for blocking and assignment of bandwidth. Considering a first scenario, where a host subscriber associated with the at least one user equipment [102A] subscribes to a one Gbps home broadband (private) and the cellular network operator provides dynamic 10 Gbps link on 1 Gbps allocated to the host subscriber and rest of the bandwidth (public) may be availed by the other user equipment [102B-102D]. The below Table 2 shows the 10 Gbps bandwidth assignment and further sharing of the bandwidth using the public wireless network [1B/2B] and the private wireless network [1A/2A].

TABLE 2

| | | Case 1 | Case 2 | Case 3 | Case 4 |
|---|---|---|---|---|---|
| Total Bandwidth is 10 Gbps | Private Unique Service Set identifier (Fixed 1 Gbps Bandwidth) | 1 Gbps | 1 Gbps | 1 Gbps | 1 Gbps |
| | Public Unique Service Set identifier (9 Gbps) | Share Bandwidth 7 Gbps | $1^{st}$ user offloaded with 2 Gbps plan | $1^{st}$ user offloaded with 2 Gbps plan | $1^{st}$ user offloaded with 2 Gbps plan |
| | | | $2^{nd}$ user offloaded with 2 Gbps plan | $2^{nd}$ user offloaded with 2 Gbps plan | $2^{nd}$ user offloaded with 2 Gbps plan |
| | | | | | $3^{rd}$ user offloaded with 1 Gbps plan |
| | | | | | $4^{th}$ user offloaded with 1 Gbps plan |
| | | | $3^{rd}$ user offloaded with 2 Gbps plan | $3^{rd}$ user offloaded with 1 Gbps plan | $5^{th}$ user offloaded with 1 Gbps plan |
| | | $1^{st}$ user offloaded with 2 Gbps plan | | $4^{th}$ user offloaded with 1 Gbps plan | $6^{th}$ user offloaded with 1 Gbps plan |

Considering a second scenario, where a host subscriber associated with the at least one user equipment [102A] upgrades the bandwidth to two Gbps home broadband (private) and the cellular network operator provides dynamic 10 Gbps link on 1 Gbps allocated to the host subscriber and rest of the bandwidth (public) may be availed by the other user equipment [102B-102D]. The below Table 3 shows the 10 Gbps bandwidth assignment and further sharing of the bandwidth using the public wireless network [1B/2B] and the private wireless network [1A/2A].

TABLE 3

| | | Case 5 | Case 6 | Case 7 | Case 8 |
|---|---|---|---|---|---|
| Total Bandwidth is 10 Gbps | Private Unique Service Set identifier (Fixed 1 Gbps Bandwidth) | 2 Gbps | 2 Gbps | 2 Gbps | 2 Gbps |

TABLE 3-continued

| | Case 5 | Case 6 | Case 7 | Case 8 |
|---|---|---|---|---|
| Public Unique Service Set identifier (8 Gbps) | Share Bandwidth with 6 Gbps | $1^{st}$ user offloaded with 2 Gbps plan | $1^{st}$ user offloaded with 2 Gbps plan | $1^{st}$ user offloaded with 2 Gbps plan $2^{nd}$ user offloaded with 2 Gbps plan |
| | | $2^{nd}$ user offloaded with 2 Gbps plan | $2^{nd}$ user offloaded with 2 Gbps plan | $3^{rd}$ user offloaded with 1 Gbps plan $4^{th}$ user offloaded with 1 Gbps plan |
| | | $3^{rd}$ user offloaded with 2 Gbps plan | $3^{rd}$ user offloaded with 1 Gbps plan | $5^{th}$ user offloaded with 1 Gbps plan |
| | $1^{st}$ user offloaded with 2 Gbps plan | | $4^{th}$ user offloaded with 1 Gbps plan | $6^{th}$ user offloaded with 1 Gbps plan |

The present invention also encompasses a system and a method for multi-tenancy of the available bandwidth subscribed by the host subscriber. By providing the bandwidth for tenancy/rental purpose, an additional source of income may be achieved. One such feature is to allow onboarding of the user equipments [102] (now tenants) for rental purpose and prioritizing the throughput of the available bandwidth. Further, the host subscriber may entertain discrete or overlapping tenancy ownership i.e. in whether allow all of the user equipments [102]/tenants to onboard or allow only certain user equipments [102]/tenants to get onboard on the extended coverage provided by the routing device [104].

Also, the tenants may prioritize the network traffic from monetization, advertisement and reporting. The monetization and advertisement may provide opportunity for tenants to promote their business locally or centrally by providing integrating management interface. Further, the tenants may use the advertisement in following ways with/without location-based services: 1) by sending SMS (or messaging variants), 2) displaying board, 3) proximity advertisement and calling, 4) sending notification, 5) local boost package, and 6) targeted advertisement.

With the feature of multitenancy, the cellular network operators may provide required analytics to enterprises that support the cellular network operators in providing extended cellular coverage using the routing devices [104]. Additionally, in the multi-tenancy approach, the radio resources are transferred in terms of physical radio resource blocks (RBs) among multiple heterogeneous macro base stations, interconnected via an X2 interface.

The present invention further facilitates the subscriber and the cellular network operators to prioritize and select between the core network and the wireless networks [1A/1B/2A/2B] using access network discovery and selection function (referred hereinafter as ANDSF) and HS2.0 (Hotspot2.0 and latest version) for radio selection. The HS2.0 is a device dependent protocol that enable the at least one user equipment [102] to select the preferred network (among the core cellular network or the wireless network [1A/1B/2A/2B] provided by the routing device [104]) or to perform the selective offload among the networks. On other hand, the ANDSF standards aim to make network transitions seamless for the users while making the network traffic manageable for the cellular network operators.

The present invention provides the following technical advantages: 1) authentication of subscribers/users with the cellular credentials over wireless network (Wi-Fi/routing device [102]) or cellular network (LTE radio) over fibre or coax or UBR or any other technology backhaul, 2) introduction of the radio/cellular technology in the Wi-Fi/routing device [102] that not only provide better coverage but also create better cellular coverage, 3) seamless connectivity by intelligently offloading network traffic between the core network (3G/4G) to the wireless network [1A/1B/2A/2B] provided by the routing device [102] (Wi-Fi), 4) better optimization of network traffic loads across licensed (core network) and non-licensed spectrum [1A/1B/2A/2B], 5) enable the user equipments [102] to discover the wireless networks [1A/1B/2A/2B] to enforce the user policies, 6) decongestion on the cellular networks, 7) enable the cellular network operators to support location based, time, profile of the user equipments [102], battery, signal strength based intelligent offload, 8) offload based on chosen network access at given point in time/day, 9) intelligent enough to dynamically select optimal routing devices [104] or select between the cellular or wireless network [1A/1B/2A/2B] provided by the routing devices [104] as the user moves to different location, 10) maintain high Quality of Experience (QoE) key to customer retention, 11) define roaming policy at the cellular network operator level in co-ordination with HS2.0, 12) ANDSF provides wholesale offload capacity to cellular network operator transparent to the users, 13) seamless wireless network connectivity for cable subscribers, 14) better data throughput, 15) improved security in comparison to client based calling, 16) mitigate costs from growth in user equipments and cloud-based services, and 17) network traffic shaping and prioritization of secure or selective traffic, high-performance routing devices [104] to improve coverage and reliability.

The units, interfaces, modules, and components depicted in the figures and described herein may be present in the form of a hardware, a software and a combination thereof. Connection/s shown between these units/components/modules/interfaces in the exemplary system architecture [100A]

and the exemplary system architecture [100B] (including routing devices [104], user equipment [102], wireless networks [1A/2A/1B/2B] and the gateways [108]) may interact with each other through various wired links, wireless links, logical links and/or physical links. Further, the units/components/modules/interfaces may be connected in other possible ways.

Though a limited number of the exemplary system architecture [100A] and the exemplary system architecture [100B] (including routing devices [104], user equipment [102], wireless networks [1A/2A/1B/2B] and the gateways [108]), units, interfaces, modules and components, have been shown in the figures; however, it will be appreciated by those skilled in the art that the exemplary system architecture [100A] and the exemplary system architecture [100B] (including routing devices [104], user equipment [102], wireless networks [1A/2A/1B/2B] and the gateways [108]) of the present invention encompasses any number and varied types of the entities/elements such as exemplary system architecture [100A] and the exemplary system architecture [100B] (including routing devices [104], user equipment [102], wireless networks [1A/2A/1B/2B] and the gateways [108]), the units, interfaces, modules and components.

Although, the present invention has been described with respect to the exemplary system architecture [100A] and [100B] where the routing device [104] provides at least two wireless networks (including the public wireless network [1B/2B] and the private wireless network [1A/2A]); however, it will be appreciated by those skilled in the art that the present invention encompasses any routing device that provide any number of wireless networks (including any number of public wireless network and the private wireless network) and all such scenarios and embodiments shall be encompassed by the present invention.

Although the FIG. 1A and FIG. 1B depict two routing devices [104], wherein the routing device [104A] providing one private wireless network [1A] and one public wireless network [1B] and routing device [104B] provides one private wireless network [2A] and one public wireless network [2B] to four user equipments [102A/102B/102C/102D]. However, it is well-understood for a person skilled in the art that any number of user equipment may get connected to any routing device providing public/private wireless network. Further, in this specification, the reference numeral [102] represents any/all of the four user equipments [102A/102B/102C/102D]. Similarly, the reference numeral [104] represents any/all of the two routing devices [104A/104B]. Also, similarly, the reference numeral [108] represents any/all of the six gateways [108A/108B/108C/108D/108E/108F].

Although, the present invention has been described with respect to the exemplary routing device [104] and the core network, however, it will be appreciated by those skilled in the art that the present invention may also be practiced in distributed computing environments where functions/operations are performed by remote processing devices that are linked through a communications network. In a distributed computing environment, program modules may be located in both local and remote computer storage media including memory storage devices.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

What is claims is:

1. A method for routing network traffic associated with at least one user equipment, the method being performed by a routing device, the method comprising:
    providing at least two wireless networks, wherein
    the at least two wireless networks are at least one of a public wireless network and a private wireless network,
    each of the at least two wireless networks has a unique service set identifier,
    the unique service set identifier is one of a public unique service set identifier and a private unique service set identifier, and
    the unique service set identifier has a corresponding gateway connected to a core network;
    establishing a connection between the at least one user equipment and one of the at least two wireless networks, wherein
    the connection is established using the unique service set identifier of one of the at least two wireless networks, and
    the connection is established in a first event the routing device receives a request from the at least one user equipment to avail at least one service,
    receiving the network traffic from the at least one user equipment through the one of the at least two wireless networks to which the connection was established in a second event the at least one user equipment avails the at least one service;
    categorizing the network traffic received from the at least one user equipment, wherein the categorisation is based on the unique service set identifier; and
    routing the network traffic from the routing device to the corresponding gateway based on the categorization, wherein the routing device is connected to the core network.

2. The method as claimed in claim 1, further comprising, identifying the unique service set identifier from the network traffic received from the at least one user equipment.

3. The method as claimed in claim 1, further comprising, categorizing the network traffic received from the at least one user equipment based on one of the unique service set identifier, an internet protocol address and a virtual routing function.

4. The method as claimed in claim 1, further comprising, seamless offloading the network traffic associated with the at least one user equipment from the core network to the routing device.

5. The method as claimed in claim 1, further comprising, billing the at least one user equipment for availing the at least one service through the routing device.

6. The method as claimed in claim 1, wherein the at least two wireless networks is at least one of a virtual wireless network and a physical wireless network.

7. The method as claimed in claim 1, wherein the corresponding gateway include at least one of a broadband gateway, a fixed line gateway, a Wi-Fi gateway, a converge mobile gateway, a S2a Mobility Over GTP (SaMOG) gateway.

8. The method as claimed in claim 1, wherein the at least one service includes at least one of a data service, a voice call service, a video call service, a voice over Wi-Fi (VoWi-Fi) voice call service, and a VoWi-Fi video call service.

9. The method as claimed in claim 1, wherein the routing device is connected to the core network through an optical fiber cable.

10. A routing device for routing network traffic associated with at least one user equipment, the routing device comprising:
a network management module configured to:
provide at least two wireless networks, wherein
the at least two wireless networks are at least one of a public wireless network and a private wireless network,
each of the at least two wireless networks has a unique service set identifier,
the unique service set identifier is one of a public unique service set identifier and a private unique service set identifier, and
the unique service set identifier has a corresponding gateway connected to a core network;
a communication module configured to establish a connection between the at least one user equipment and one of the at least two wireless networks, wherein
the connection is established using the unique service set identifier of one of the at least two wireless networks, and
the connection is established in a first event the router receives a request from the at least one user equipment to avail at least one service;
a traffic module configured to:
receive the network traffic from the at least one user equipment through the one of the at least two wireless networks to which the connection was established in a second event the at least one user equipment avails the at least one service, and
categorize the network traffic received from the at least one user equipment, wherein the categorisation is based on the unique service set identifier; and
a routing module configured to route the network traffic from the router to the corresponding gateway based on the categorization, wherein the router is connected to the core network.

11. The routing device as claimed in claim 10, further comprising, a billing gateway configured to the at least one user equipment for availing the at least one service through the routing device.

12. The routing device as claimed in claim 10, wherein the at least two wireless networks is one of a virtual wireless network and a physical wireless network.

13. The routing device as claimed in claim 10, wherein the at least one service includes at least one of a data service, a voice call service, a video call service, a voice over Wi-Fi (VoWi-Fi) voice call service, and a VoWi-Fi video call service.

14. The routing device as claimed in claim 10, wherein the one or more gateways include at least one of a broadband gateway, a fixed line gateway, a Wi-Fi gateway, a converge gateway, a S2a Mobility Over GTP (SaMOG) gateway.

* * * * *